United States Patent [19]

Sato et al.

[11] Patent Number: 5,132,136
[45] Date of Patent: Jul. 21, 1992

[54] CONDENSED WINE COMPOSITION FOR COOKING AND METHOD OF PREPARING THE SAME

[75] Inventors: Michikatsu Sato; Machiko Watanabe; Yoshiaki Yagi, all of Fujisawa, Japan

[73] Assignee: Mercian Corporation, Tokyo, Japan

[21] Appl. No.: 658,162

[22] Filed: Feb. 20, 1991

[30] Foreign Application Priority Data

Feb. 20, 1990 [JP] Japan ................... 2-37351

[51] Int. Cl.⁵ .............................................. A23L 1/222
[52] U.S. Cl. ................................... 426/493; 426/495; 426/650
[58] Field of Search ............... 426/487, 492, 493, 495, 426/592, 330.4, 650, 655

[56] References Cited

U.S. PATENT DOCUMENTS

| | | | |
|---|---|---|---|
| B. 552,726 | 2/1976 | Nagasawa | 426/592 |
| 1,915,273 | 6/1933 | Eoff | 426/592 |
| 3,988,486 | 10/1976 | Rhein | 426/495 |
| 4,015,020 | 3/1977 | Nagasawa | 426/493 |
| 4,112,128 | 9/1978 | Fessler | 426/330.4 |
| 4,322,446 | 3/1982 | Heess | 426/330.4 |
| 4,351,851 | 9/1982 | Riese | 426/495 |
| 4,461,778 | 7/1984 | Vialette | 426/592 |
| 4,490,399 | 12/1984 | Weetall | 426/330.4 |
| 4,500,554 | 2/1985 | Weetall | 426/330.4 |
| 4,560,565 | 12/1985 | Wucherpfennig | 426/592 |
| 4,568,549 | 2/1986 | Melandri | 426/489 |
| 4,597,978 | 7/1986 | Dimitriou | 426/492 |
| 4,626,437 | 12/1986 | Schobinger | 426/493 |
| 4,775,538 | 10/1988 | Boucher | 426/493 |
| 4,794,013 | 12/1988 | Gresch | 426/489 |
| 4,889,743 | 12/1989 | Tazawa | 426/495 |
| 4,891,236 | 1/1990 | Ohta | 426/330.4 |
| 4,942,045 | 7/1990 | Thumm | 426/592 |
| 4,976,974 | 12/1990 | Thumm | 426/592 |

FOREIGN PATENT DOCUMENTS

| | | | |
|---|---|---|---|
| 0061949 | 10/1982 | European Pat. Off. | 426/592 |
| 2744950 | 4/1979 | Fed. Rep. of Germany | 426/489 |
| 3244221 | 4/1984 | Fed. Rep. of Germany | 426/592 |
| 2087286 | 5/1970 | France | 426/493 |
| 2258800 | 1/1974 | France | 426/489 |
| 2392117 | 1/1979 | France | 426/495 |
| 2441343 | 7/1980 | France | 426/489 |

Primary Examiner—Carolyn Paden
Attorney, Agent, or Firm—Joseph C. Mason, Jr.; Ronald E. Smith

[57] ABSTRACT

A condensed wire composition containing an extract content of no less than 18% (w/v) is obtained by vacuum condensing a wine at a temperature of 5° to 60° C., preferably 20° to 35° C. to a concentration by at least 8 times as high as the original, retaining the resulting condensate at a low temperature, e.g., 0° to 10° C. to crystallize tartar, and removing the tartar. An initial distillate obtained upon the vacuum condensing of the wine and/or brandy may be added to the condensed wine in such an amount that final product has an alcohol content less than 1% (v/v).

11 Claims, No Drawings

CONDENSED WINE COMPOSITION FOR COOKING AND METHOD OF PREPARING THE SAME

FIELD OF THE INVENTION

The present invention relates to a condensed wine composition for cooking and a method of preparing the same.

BACKGROUND OF THE INVENTION

When used for cooking, wines exhibit various effects such as effect of masking unpleasant smells of meats and fish, effect of improving aroma and effect of softening the texture of meat and therefore have been widely used for cooking as well as for drinking.

Heretofore, when they are used for cooking it has been mostly the case that wines are added to food materials and cooked together or they are heated in a pan and condensed before use. For example, wines are used as a dipping sauce for dipping food materials in order to make food tasty, or as a broth for boiling or steaming fishes, shellfishes or meats. Also, wines are used for preparing various sauces and well cooked jelly.

In banquets held in, for example, hotels or restaurants, it is often necessary to prepare and serve a dish in large amounts at a time and when wine is to be used in a condensed state, it is necessary to boil a large amount of wine in a pan to concentrate it on previous night or well before setting the table, which is inconvenient to cooks in many respects. For example, it takes much time and the smell of the wine scatters around and hangs over in the cuisine.

Further, conventional concentration by heating in a pan of red and white wines results in browning and as a result it has been impossible to obtain condensed wine of a high quality which has a good color tone and meets purpose for which it is used. To date, it has been impossible to get condensed wines for cooking and therefore there is a demand for condensed wine for cooking having a high quality.

Among related arts, there have heretofore been proposed various improvements in the method of utilizing condensed grape juice as a raw material for wines. For example, there have been proposed a method of improving the quality of grape juice to be used for the production of wine in which acid contents are removed by reverse osmosis using a membrane (Japanese Patent Application Laid-Open No. 129797/1975); a method of removing unpleasant smell of wine prepared from heated condensed grape juice (mastic) in which condensed grape juice is fermented after it is diluted with water and purified using a combination of an ion exchange membrane and electrodialysis (Japanese Patent Application Laid-Open No. 77884/1980); a method of freezing condensation in which freezing condensation is performed after adding an alcohol to fruit juice in an amount of 0.5 to 2.4 g per 100 ml of juice (Japanese Patent Application Laid-Open No. 141188/1980); and the like. However, these methods all relate to condensation of raw material juice for preparing wines for drinking before fermentation but are not a technique of condensation of wines for cooking.

That is, as far as is known, there has heretofore been no idea of providing condensed wine, for cooking having a good quality and a high concentration by condensation.

SUMMARY OF THE INVENTION

It is an object of the present invention to provide a condensed wine composition prepared by condensing a wine by vacuum condensation which does not deteriorate its quality and removing tartar which is crystallized at low temperatures as well as a method for preparing the same.

Therefore, according one aspect of the present invention, there is provided a condensed wine composition containing an extract i.e., non-volatile content of no less than 18% (w/v) and being obtained by vacuum i.e., sub-atmospheric, condensation to a concentration of at least 8 times as high as the original, retaining the resulting condensate at a low temperature to allow tartar to be crystallized, and removing the tartar.

The vacuum condensation may be carried out to a concentration as high as 10 to 20 times the original.

The condensed wine composition may contain alcohols in an amount of less than 1% (v/v).

According to another aspect of the present invention, there is provided a method of preparing a condensed wine composition containing an extract content of not less than 18% (w/v), comprising vacuum condensing a wine at a temperature of 5° to 60° C. to a concentration of at least 8 times as high as the original, retaining the resulting condensate at a low temperature.

The wine may be vacuum condensed at a temperature of 20° to 35° C. to a concentration of 10 to 20 times as high as the original.

After the vacuum condensation, the wine may be retained at a low temperature of 0° to 10° C. to crystallize tartar.

An initial distillate obtained upon the vacuum condensing of the wine and/or brandy may be added to condensed wine in such an amount that final product has an alcohol content less than 1% (v/v).

The condensed wine composition of the present invention is condensed by 10 to 20 times the original without deteriorating taste and flavor of the raw material wine and can be stored for a long time in a refrigerator or at room temperature with retaining its quality. Therefore, it can be used advantageously not only for business use such as cases in which a large amount of dishes must be prepared and served at a time, e.g., in hotels or restaurants but also as a seasoning for domestic use.

DETAILED DESCRIPTION OF THE INVENTION

The wine referred to herein is a kind of so-called fruit liquor and is prepared from grape as raw material by fermenting grape juice by action of yeast and reserving the resulting liquor in a barrel or bottle, if desired. Usually, red wine, white wine and rose wine are well known.

The wine used in the present invention may be of any type so far as it is suitable for drinking i.e., potable, and includes, besides natural wines, i.e., red, white and rose wines brewed by fermenting grape juice alone as described above, so-called strengthened wines composed of condensed fruit juice to which brandy is added such as sherry, Port, Madeira, Malaga and Marsala or blend wines represented by vermout obtained by adding medicinal herbs, spices, dyestuffs and the like to a wine. The condensed wine composition can also be obtained from a sparkling wine such as champagne. However, sparkling wines are not used usually.

The condensed wine composition of the present invention is a composition which is obtained from the above described wines by vacuum condensation to a concentration of at least 8 times as high as the original potable wine under conditions not deteriorating their quality so that the product has an extract or non-volatile content of no less than 18% (w/v). This condensed wine composition is different from ordinary wines for drinking in that all or almost all alcohol has been removed therefrom during the condensation and has an alcohol content of below 1% and it is impotable in that the wine concentrate of the present invention is not intended for, nor generally suitable for drinking alone but which is nevertheless safe for use in foods.

If desired, brandy or the initial distillate upon the vacuum condensation which includes the aroma component of the wine may be added to the condensed wine composition of the present invention in an amount in terms of alcohol content within the range of below 1% (v/v).

In the preparation of the condensed wine composition of the present invention, the condensing ratio of 8 times the original potable wine is sufficient for the purpose but the condensing ratio is preferably 10 to 20 times the original. On this occasion, the extract content of not less than 18% (w/v) is sufficient but is preferably 20 to 30% (w/v).

If the condensing ratio is less than 8 times the original, the concentration of the condensed wine is lower than that is actually used in the cuisine and further condensation has to be carried out on the spot before it is used for cooking, and therefore the condensing ratio of less than 8 times the original does not meet the purpose of the present invention.

On the other hand, the condensation ratio exceeding 20 times the original is undesirable because the increase in viscosity of the condensed wine increases to makes it difficult to handle the wine concentrate and because further dilution becomes necessary before use because condensates having concentrations of 10 to 20 times the original are used preferably.

The condensed wine composition of the present invention can be prepared by a method in which a wine is condensed using a vacuum condenser such as a rotary evaporator, or a vacuum condenser called condensing boiler.

While vacuum condensing method is a widely used condensing method but it has heretofore been unknown as a method of preparing a condensed wine for cooking.

Although detailed explanation will be made on a method of condensing a wine using a rotary evaporator hereafter, a method in which condensation is carried out using a vacuum condenser called condensing boiler is essentially the same as the case in which a rotary evaporator is used.

In order to obtain vacuum or reduced pressure, a water seal pump, a tap aspirator, a vacuum pump and the like can be used. Although it is usually sufficient to use a tap aspirator, the use of a vacuum pump is preferred.

The temperature of vacuum condensation may be such that the material charged is at 5° to 60° C., preferably 10° to 45° C., more preferably 20° to 35° C. In terms of the temperature of a water bath used for heating a vessel in which a sample is charged, which temperature varies more or less depending on the degree of vacuum, it is sufficient to heat the bath at a temperature of 40° to 80° C., preferably 50° ±10° C.

If the temperature of the water bath is higher than is described above, generally the speed of condensation increases, and on this occasion care must be taken so as not to lower the degree of vacuum because if the degree of vacuum decreases the temperature of the material is elevated to cause browning of the resulting condensed wine or deterioration of its aroma. When the temperature at which the distillate obtained as a result of the vacuum condensation is trapped is low, e.g., at 5° C. and the vacuum condensation is carried out at a high vacuum, the temperature of the material is retained at lower than 30° C., resulting in that there can be obtained a condensed wine composition having excellent color and taste.

When the resulting condensed wine is left to stand at low temperatures, tartar precursors, e.g., tartaric acid contained in the wine crystallizes out as tartar. This tartar must be removed, and the removal of tartar brings about a wine condensate having an excellent storage stability.

Suitable retention temperature of the wine condensate for crystallizing out tartar is 0° to 10° C., preferably 5° ±3° C. The time of retaining at low temperatures may vary depending on the temperature used but usually it is sufficient to stand the wine condensate for 5 to 48 hours, preferably for one night (about 16 hours) for crystallization of tartar.

Removal of tartar can be carried out by conventional methods generally used for removing ordinary precipitates and there is no limitation on the method of separation. Generally, tartar can be removed by filtration under pressure using diatomaceous earth as a filter aid, membrane filtration using a membrane filter, filtration under reduced pressure, centrifugal separation or the like.

Usually, wines used have already been subjected to fining procedures of sediment separation and therefore they seldom become hazy due to presence of proteins when they are condensed but further fining of the wine removing extra amount of proteins may be performed after the condensation, if desired.

For the sediment separation, any conventional fining method used in the sediment separation of ordinary wines can be used but is not limited particularly.

The initial distillate which is optionally added to the wine condensate may suitably be the one obtained at a timing when a lighter boiling first fraction of distillate of about 5% by volume of the wine subjected to the condensation is distilled off in the case where ordinary wines are used for condensation. At that moment, the initial distillate obtained has an alcohol content is generally 30 to 75%, usually 45 to 70% (v/v). The initial distillate thus obtained is added to the condensed wine in a proper amount taking into consideration the alcohol concentration of the resulting initial distillate so that its final concentration can be below 1% (v/v), a condensed wine with a strengthened aroma component is obtained. Also, it is possible to use brandy instead of the above-described initial distillate. The amount of brandy to be added is within the range such that the final alcohol concentration of the resulting condensed wine is below 1% by volume.

If the final concentration of the alcohol exceeds 1% (v/v), the wine condensate obtained may be classified into the group of liquor for drinking under Liquor Tax Law in some countries (in Japan, 1% is a turning point), and care must be take in this respect because the condensed wine of the present invention is for cooking but not intended to be used as a liquor for drinking.

EXAMPLES

Hereafter, the present invention will be explained in greater detail by examples and comparative examples. However, the present invention should not be construed as being limited thereto.

EXAMPLE 1

Three liters of a commercial white wine (Tokuyo Mercian, trade name for a product of Sanraku Co., Ltd.) having an alcohol content of 11.5% (v/v), an extract content of 1.8% (w/v) and a total acidity of 7.86 ml was condensed to a volume of 300 ml using a rotary evaporator. Reduction in pressure was made using a tap aspirator, and cooling of the trap was controlled to 5° C. using a circulating cooler (Cool Ace, produced by Tokyo Rika Kikai Co., Ltd.). The temperature of water bath was set up at 45° C. On this occasion, the temperature of the sample to be condensed during condensation was 30° C. After condensing the wine to a concentration 10 times the original, the wine condensate was left to stand in a cold room at 10° C. for 16 hours to crystallize a large amount (about 10 g) of tartar, which was removed by filtration under pressure using a membrane filter (membrane filter used: pore diameter, 0.45 μm; cellulose acetate membrane, produced by Toyo Rosi Co., Ltd.).

The condensed wine thus obtained was analyzed as described below according to the method of wine analysis described in Wine Analysis Commentary prescribed by the Japanese Tax Agency, 3rd. Ed.

That is, the alcohol in the condensed wine was determined based on alcohol oxidase according to an immobilized enzyme electrode method using Automated Enzyme Electrode Analyzer produced by Toyo Jozo Co., Ltd.

The total acidity was determined by titrating 10 ml of the wine with 0.1 N NaOH using phenolphthalein as an indicator and represented as amount of liquid (ml) required for its neutralization.

The extract content was expressed by gram (g) number of nonvolatile components contained in 100 ml of the wine which was calculated by the following equation.

$$E = (S - A) \times 260 + 0.21$$

wherein E is the extract content of the wine, S is the specific gravity of the wine at 15° C., and A is the specific gravity at 15° C. of an aqueous solution of alcohol containing alcohol in an amount corresponding to the alcohol concentration of the wine.

The direct reducing sugar amount was measured by the copper method according to Lane-Eynon (Lane-Eynon General Volumetric Method).

The optical density (OD) was measured using a spectrophotometer.

Table 1 shows the results of the analysis. pH and specific gravity were measured after diluting the condensed wine back to the original values.

TABLE 1

| Item of Analysis | (Unit) | Value |
|---|---|---|
| Alcohol content | (%, v/v) | 0 |
| Total acidity | (ml) | 63.4 |
| Extract content | (%, w/v) | 23.0 |

TABLE 1-continued

| Item of Analysis | (Unit) | Value |
|---|---|---|
| Direct reducing sugar | (%, w/v) | 6.5 |
| Optical density (OD) | | |
| OD at 370 nm | | 4.97 |
| OD at 430 nm | | 0.67 |
| OD at 520 nm | | 0.18 |
| OD at 660 nm | | 0.02 |
| pH* | | 2.87 |
| Specific gravity* | | 1.008 |

Note: *analysis value when diluted 10 times.

The condensed wine obtained had a low OD value at 430 nm which is indicative of browning and showed that browning did not proceed. It has a good taste and was suitable for a condensed wine for cooking.

EXAMPLE 2

Three liters of the same commercial white wine as used in Example 1 was condensed in the same manner as in Example 1 using a rotary evaporator. When the amount of distillate reached about 150 ml, the condensation was temporarily stopped, and the instant distillate or lighter bailing first fraction was preserved as an initial distillate. Then the vacuum condensation was started again thereby producing a lower boiling second fraction of distillate, and the condensation was ceased when the amount of the condensed liquid reached about 290 ml. This condensed liquor was left to stand in a cold room at 10° C. for 16 hours, a large amount (about 8.0 g) of tartar was crystallized out, which was then subjected to filtration under pressure using a membrane filter in the same manner as in Example 1.

The concentration of alcohol of the initial distillate measured by the specific gravity method was 67.1% (v/v). After adding the initial distillate to the above wine condensate so that the final alcohol concentration of the mixture was about 0.6% (v/v), the total volume of the mixture was adjusted to 300 ml with water to prepare a condensed white wine in a concentration of 10 times the original.

The resulting condensed wine was analyzed in the same manner as in Example 1. Table 2 shows the results obtained.

TABLE 2

| Item of Analysis | (Unit) | Value |
|---|---|---|
| Alcohol content | (%, v/v) | 0.59 |
| Total acidity | (ml) | 66.8 |
| Extract content | (%, w/v) | 26.0 |
| Direct reducing sugar | (%, w/v) | 6.6 |
| Optical density (OD) | | |
| OD at 370 nm | | 5.12 |
| OD at 430 nm | | 0.63 |
| OD at 520 nm | | 0.17 |
| OD at 660 nm | | 0.03 |
| pH* | | 2.94 |
| Specific gravity* | | 1.008 |

Note: *analysis value when diluted 10 times.

The condensed white wine obtained had a low OD value at 430 nm which is indicative of browning and showed that browning did not proceed. As a result of the addition of the initial distillate, the condensed wine have retained a good taste and flavor of original wine and was suitable for a condensed wine for cooking.

EXAMPLE 3

Three liters of a commercial red wine (Tokuyo Mercian, trade name for a product of Sanraku Co., Ltd.)

having an alcohol content of 11.4% (v/v), an extract content of 2.6% (w/v) and a total acidity of 7.78 ml was condensed to a volume of 300 ml using a rotary evaporator. Reduction in pressure was made using a tap aspirator, and cooling of the trap was controlled to 5° C. using a circulating cooler (Cool Ace, produced by Tokyo Rika Kikai Co., Ltd.). The temperature of water bath was set up at 45° C. On this occasion, the temperature of the sample to be condensed during condensation was 30° C. After condensing the wine to a concentration 10 times the original, the wine condensate was left to stand in a cold room at 10° C. for 16 hours to crystallize a large amount (about 12 g) of tartar, which was removed by filtration under pressure using a membrane filter (membrane filter used: pore diameter, 0.45 μm; cellulose acetate membrane, produced by Toyo Rosi Co., Ltd.).

The condensed wine thus obtained was analyzed in the same manner as in Example 1. Table 3 shows the results obtained.

TABLE 3

| Item of Analysis | (Unit) | Value |
|---|---|---|
| Alcohol content | (%, v/v) | 0 |
| Total acidity | (ml) | 59.9 |
| Extract content | (%, w/v) | 23.0 |
| Direct reducing sugar | (%, w/v) | 7.1 |
| Optical density (OD) | | |
| OD at 370 nm | | 33.15 |
| OD at 430 nm | | 17.45 |
| OD at 520 nm | | 17.55 |
| OD at 660 nm | | 1.10 |
| pH* | | 3.33 |
| Specific gravity* | | 1.008 |

Note: *analysis value when diluted 10 times.

The condensed red wine obtained had a high OD value at 520 nm which is specific absorption of reddish purple color of the red wine and gave a clear color tone. It had a good taste and was suitable for condensed wine for cooking.

EXAMPLE 4

Three liters of the same commercial red wine as used in Example 3 was condensed in the same manner as in Example 1 using a rotary evaporator. When the amount of distillate reached about 200 ml, the condensation was temporarily stopped, and the instant distillate was preserved as an initial distillate. Then the vacuum condensation was started again, and the condensation was ceased when the amount of the condensed liquid reached about 290 ml. This condensed liquor was left to stand in a cold room at 10° C. for 16 hours, a large amount (about 15.9 g) of tartar was crystallized out, which was then subjected to filtration under pressure using a membrane filter in the same manner as in Example 1.

The concentration of alcohol of the initial distillate measured by the specific gravity method was 45.3% (V/V). After adding the initial distillate to the above wine condensate so that the final alcohol concentration of the mixture was about 0.95% (v/v), the total volume of the mixture was adjusted to 300 ml with water to prepare a condensed red wine in a concentration of 10 times the original.

The resulting condensed wine was analyzed in the same manner as in Example 1. Table 4 shows the results obtained.

TABLE 4

| Item of Analysis | (Unit) | Value |
|---|---|---|
| Alcohol content | (%, v/v) | 0.59 |
| Total acidity | (ml) | 53.5 |
| Extract content | (%, w/v) | 26.0 |
| Direct reducing sugar | (%, w/v) | 4.9 |
| Optical density (OD) | | |
| OD at 370 nm | | 31.0 |
| OD at 430 nm | | 16.45 |
| OD at 520 nm | | 15.55 |
| OD at 660 nm | | 1.11 |
| pH* | | 3.40 |
| Specific gravity* | | 1.008 |

Note: *analysis value when diluted 10 times.

The condensed red wine obtained had a high OD value at 520 nm which is specific absorption of reddish purple color of the red wine gave a clear color tone. As a result of the addition of the initial distillate, the condensed wine have retained a good taste and flavor of the original wine and was suitable for a condensed wine for cooking.

REFERENCE EXAMPLE 1

Three liters of the same commercial white wine as used in Example 1 was charged in a pan of about 4 liters in volume and heated at first at strong fire and then at weak fire as soon as the amount of the liquid reached about 1 liter using a gas range up until the amount of the liquid reached about 250 ml. The resulting condensed white wine liquid condensed about 12 times was left to stand in a cold room at 10° C. for 16 hours, and a large amount (about 8.5 g) of tartar was crystallized out, which was removed by filtration under pressure using a membrane filter (membrane filter used: pore diameter, 0.45 μm; cellulose acetate membrane, produced by Toyo Rosi Co., Ltd.). The volume of finally obtained condensed white wine was 240 ml. Thus, the condensation ratio was 12.5 times the original.

There was a fear of getting burned when heating a wine by boiling it in a pan in the case where the amount of the liquid became small and therefore a care had to be taken in this respect.

The condensed wine thus obtained was analyzed in the same manner as in Example 1. Table 5 shows the results obtained.

TABLE 5

| Item of Analysis | (Unit) | Value |
|---|---|---|
| Alcohol content | (%, v/v) | 0 |
| Total acidity | (ml) | 65.13 |
| Extract content | (%, w/v) | 28.75 |
| Direct reducing sugar | (%, w/v) | 9.13 |
| Optical density (OD) | | |
| OD at 370 nm | | 9.45 |
| OD at 430 nm | | 2.46 |
| OD at 520 nm | | 0.78 |
| OD at 660 nm | | 0.13 |
| pH* | | 2.98 |
| Specific gravity* | | 1.008 |

Note: *analysis value when diluted 12.5 times.

The condensed white wine obtained had an OD value at 430 nm, which is indicative of browning, remarkably higher than the values obtained in Examples 1 and 2 (0.67 and 0.63, respectively) and showed that browning did proceed considerably. Virtually, this condensed white wine appeared reddish brown visually and therefore was suitable for white wine for cooking. From the point of view of taste, it showed so-called burnt smell and was unsuitable for cooking in this respect too. Further, when heated using a gas range, alcohol and volatile components were scattered, which suggested that practical use was impossible in view of their smell and flammability. Furthermore, with this method, care had to be taken if burning of wine occurred and thus watching the condensing wine was necessary while boiling it.

REFERENCE EXAMPLE 2

Three liters of the same commercial red wine as used in Example 3 was charged in a pan of about 4 liters in volume and condensed until the volume of the liquid reached about 300 ml using a gas range in the same manner as in Reference Example 1. The condensed red wine thus condensed 10 times the original was left to stand in a cold room at 10° C. for 16 hours, and a large amount (about 10.5 g) of tartar was crystallized out, which was removed by filtration under pressure using a membrane filter in the same manner as in Example 1. Finally, 300 ml of condensed red wine was obtained and thus the condensation ratio was 10 times the original.

The condensed wine thus obtained was analyzed in the same manner as in Example 1. Table 6 shows the results obtained.

TABLE 6

| Item of Analysis | (Unit) | Value |
| --- | --- | --- |
| Alcohol content | (%, v/v) | 0 |
| Total acidity | (ml) | 61.90 |
| Extract content | (%, w/v) | 26.0 |
| Direct reducing sugar | (%, w/v) | 4.40 |
| Optical density (OD) | | |
| OD at 370 nm | | 46.30 |
| OD at 430 nm | | 25.75 |
| OD at 520 nm | | 22.35 |
| OD at 660 nm | | 2.35 |
| pH* | | 3.41 |
| Specific gravity* | | 1.009 |

Note: *analysis value when diluted 10 times.

The condensed red wine obtained had an OD value at 430 nm, which is indicative of browning, significantly higher than the value of OD at 520 nm which indicates reddish purple color. This indicated clearly that browning did proceed considerably. Virtually, this condensed red wine showed a high degree of browning and therefore was unsuitable for red wine for cooking. From the point of view of taste, it give so-called burnt smell and was unsuitable for cooking in this respect, too. Further, when heated using a gas range, alcohol and volatile components were scattered and hanged over in the kitchen, which suggested that practical use was impossible in view of their smell and flammability. Furthermore, with this method, care had to be taken if burning of wine occurred and thus watching the condensing wine was necessary while boiling it.

REFERENCE EXAMPLE 3

Two liters of the same commercial white wine as used in Reference Example 1 was charged in a polyvinyl chloride bag so that no air contained therein and sealed tightly. This was cooled at first in a refrigerator at −30° C. until a small amount of ice was formed. Then, the bag was transferred to a cold store room at −10° C. and left to stand there for one night with gradually increasing the amount of ice, thus performing refrigeration-condensation. After about 24 hours, the non-refrigerated portion was separated by filtration under reduced pressure using a filter paper to give 960 ml of condensed white wine. Therefore, the condensation ratio was about twice the original.

General analysis of the resulting refrigeration-condensed wine was carried out in the same manner as in Example 1. Table 7 shows the results obtained.

TABLE 7

| Item of Analysis | (Unit) | Value |
| --- | --- | --- |
| Alcohol content | (%, v/v) | 18.8 |
| Total acidity | (ml) | 10.4 |
| Extract content | (%, w/v) | 4.20 |
| Direct reducing sugar | (%, w/v) | 4.70 |
| Optical density (OD) | | |
| OD at 370 nm | | 0.764 |
| OD at 430 nm | | 0.106 |
| OD at 520 nm | | 0.03 |
| OD at 660 nm | | 0.004 |
| pH* | | 2.95 |
| Specific gravity* | | 0.994 |

Note: *analysis value when diluted twice.

The refrigeration-condensed white wine obtained had a relatively low condensation ratio, i.e., about 2 times the original and was unsuitable for practical use. With this refrigeration condensation metho, even if the refrigeration was programmed in order to increase the efficiency, condensation up to a condensation ratio of 10 times the original was impossible, and the quality required in the invention was not obtained.

Therefore, it revealed that refrigeration-condensation failed to give rise to condensed wine for cooking.

REFERENCE EXAMPLE 4

Two liters of the same commercial red wine as used in Reference Example 1 was charged in a polyvinyl chloride bag so that no air contained therein and sealed tightly. This was cooled at first in a refrigerator at −30° C. until a small amount of ice was formed. Then, the bag was transferred to a cold store room at −10° C. and left to stand there for one night with gradually increasing the amount of ice, thus performing refrigeration-condensation. After about 24 hours, the non-refrigerated portion was separated by filtration under reduced pressure using a filter paper to give 1070 ml of condensed red wine. Therefore, the condensation ratio was about twice the original.

General analysis of the resulting refrigeration-condensed wine was carried out in the same manner as in Example 1. Table 8 shows the results obtained.

TABLE 8

| Item of Analysis | (Unit) | Value |
| --- | --- | --- |
| Alcohol content | (%, v/v) | 16.6 |
| Total acidity | (ml) | 9.16 |
| Extract content | (%, w/v) | 3.60 |
| Direct reducing sugar | (%, w/v) | 2.90 |
| Optical density (OD) | | |
| OD at 370 nm | | 4.34 |
| OD at 430 nm | | 2.23 |
| OD at 520 nm | | 2.14 |
| OD at 660 nm | | 0.13 |
| pH* | | 3.33 |
| Specific gravity* | | 0.995 |

Note: *analysis value when diluted twice.

The refrigeration-condensed red wine obtained had a relatively low condensation ratio, i.e., about 2 times the original and was unsuitable for practical use as a condensed wine for cooking. With this refrigeration-condensation method, even if the refrigeration temperature was programmed in order to increase the efficiency, condensation up to a condensation ratio of 10 times the original was impossible, and the quality required in the invention was not obtained.

Therefore, it revealed that refrigeration-condensation failed to give rise to condensed wine for cooking.

As described above, from the results of Examples 1 to 4 and Reference Examples 1 to 4, it can be seen that the condensed wine prepared by condensation under reduced pressure according to the present invention is obviously superior as a wine-based product for cooking to the condensed wines prepared by atmospheric pressure condensation as by boiling the wine in a pan or refrigeration-condensation, and therefore, the present invention is superior to the conventional techniques.

What is claimed is:

1. A condensed wine for cooking having a non-volatile component of not less than 18% (w/v) and a volatile alcohol component of less than 1% (v/v) produced by vacuum condensation of a potable fermented wine to a condensation of at least 8 times as high as the potable fermented wine, subjecting the resulting condensate to a low temperature sufficient to crystallize tartar, and removing the tartar.

2. A condensed wine for cooking according to claim 1 wherein the vacuum condensation is carried out to a concentration of 10 to 20 times the concentration of the potable fermented wine.

3. Method of preparing a condensed wine for cooking having a non-volatile component of not less than 18% (w/v) and a volatile alcohol component of less than 1% (v/v) comprising vacuum condensing a potable fermented wine at a temperature from 5° C. to 60° C. to a concentration of at least 8 times as high as the potable fermented wine, subjecting the resulting condensate to a low temperature sufficient to crystalline tartar, removing the tartar, and recovering a condensed wine for cooking.

4. Method according to claim 3 wherein the vacuum condensation is carried out at a temperature from 20° to 35° C. to a concentration of from 10 to 20 times as high as the potable fermented wine.

5. Method according to claim 4 wherein the resulting condensate is retained at a temperature from 0° C. to 10° C. for a time sufficient to crystallize tartar.

6. Method of producing a condensed wine for cooking which comprises:
   (1) introducing a potable fermented wine containing tartar precursors and having an alcohol content in excess of 1.0% by volume into an evaporator maintained under sub-atmospheric pressure and from 5° C. to 60° C. temperature;
   (2) removing vaporized distillate containing alcohol from the evaporator whereby the resulting condensed wine is reduced in alcohol content to less than 1% by volume and concentrated with tartar precursors;
   (3) cooling the resulting condensed wine to crystallize the tartar precursors therefrom; and
   (4) removing the crystallized tartar precursors from the resulting condensed wine thereby producing a condensed wine for cooking.

7. Method according to claim 6 where a portion of distillate is added to a condensed wine for cooking prior to its use in preparing foods.

8. Method of producing a condensed wine for cooking which comprises:
   (1) introducing a potable fermented table wine containing tartar precursors and having an alcohol content in excess of 1.0% by volume into an evaporation zone maintained under sub-atmospheric pressure and a temperature from 5° C. to 60° C. whereby the potable fermented table wine is concentrated 10 to 20 times the concentration of the potable fermented table wine and is reduced in alcohol content to less than 1% by volume;
   (2) reducing the temperature of the reduced alcohol content fermented wine to a temperature from 0° C. to 10° C. sufficient to crystallize tartar compounds; and,
   (3) removing crystallized tartar compounds thereby producing a condensed wine for cooking having an alcohol content of less than 1.0% by volume.

9. Method of producing a condensed wine for cooking which comprises:
   (1) introducing a potable fermented table wine having a non-volatile component including tartar precursors of not less than 18% (w/v) and a volatile component containing alcohol of more than 1% (v/v) into an evaporation zone maintained under sub-atmospheric pressure and at a temperature from 5° C. to 60° C. which is sufficient to produce a distillate fraction of the fermented wine and a concentrate fraction of the fermented wine having a non-volatile component including tartar precursors of from 18% to 30% (w/v) and an alcohol content of less than 1% (v/v);
   (2) removing the distillate fraction from the evaporation zone;
   (3) subjecting the concentrate fraction to a temperature from 0° C. to 10° C. for a time sufficient to crystallize non-volatile tartar components therein;
   (4) separating the crystallized tartar components from the concentrate fraction thereby producing a concentrate fraction of reduced tartar content;
   (5) recovering the concentrate fraction as a condensed wine for cooking having a non-volatile component of from 18% to 30% (w/v) and an alcohol content of less than 1% (v/v).

10. Method according to claim 9 wherein the distillate fraction is removed and separated into a lighter boiling first fraction and a lower boiling second fraction and the first fraction is returned and admixed with the concentrate fraction of reduced tartar content.

11. Method according to claim 10 wherein the distillate first fraction has an alcohol content from 30% to 75% (v/v).

* * * * *